V. BIELA.
TRACTION WHEEL.
APPLICATION FILED MAR. 10, 1914.

1,125,800.

Patented Jan. 19, 1915.

Inventor
Valentine Biela.

Witnesses

By Victor J. Evans
Attorney

UNITED STATES PATENT OFFICE.

VALENTINE BIELA, OF CESTOHOWA, TEXAS.

TRACTION-WHEEL.

1,125,800.  Specification of Letters Patent.  Patented Jan. 19, 1915.

Application filed March 10, 1914. Serial No. 823,777.

*To all whom it may concern:*

Be it known that I, VALENTINE BIELA, a citizen of the United States, residing at Cestohowa, in the county of Karnes and State of Texas, have invented new and useful Improvements in Traction-Wheels, of which the following is a specification.

This invention relates to traction wheels, and its primary object is to provide a simple, strong, durable and inexpensive type of traction wheel, which is adapted to afford a firm engagement between the wheel and ground.

A further object of the invention is to provide a traction wheel having a removable auxiliary gripping surface, tread or tire, which may be conveniently detached when its use is not desired, and as conveniently applied to secure additional purchase of the wheel upon the ground, and to prevent slipping of the wheel upon roads and street surfaces.

The invention consists of the features of construction, combination and arrangement of parts herein fully described and claimed, reference being had to the accompanying drawing in which:—

Figure 1:
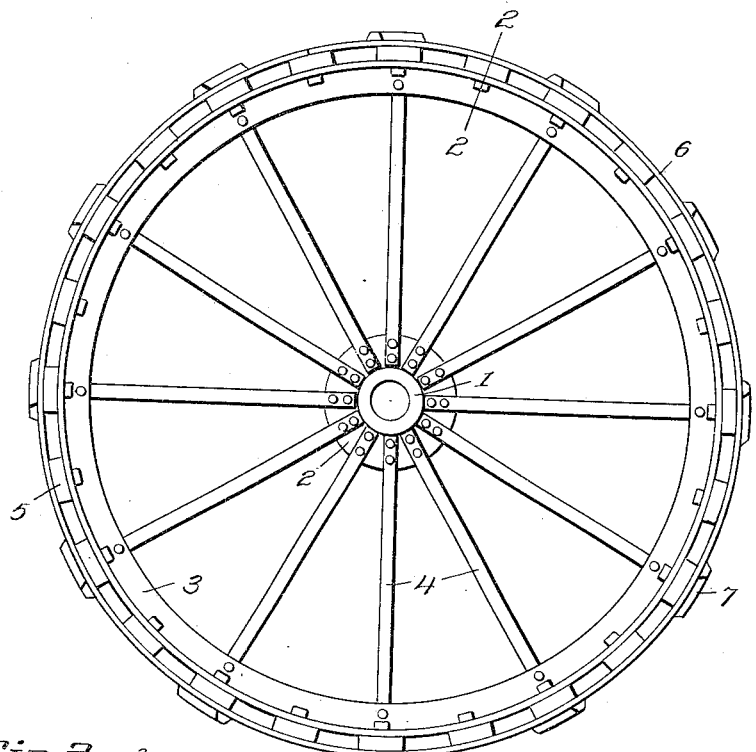
Figure 2:
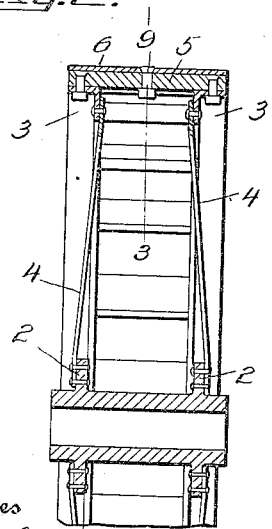
Figure 3:
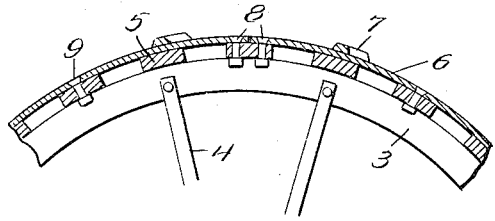

Figure 1 is a side elevation of a traction wheel embodying my invention and showing the outer tire or gripping rim applied. Fig. 2 is a vertical transverse section on the line 2—2 of Fig. 1. Fig. 3 is a sectional view taken circumferentially through a portion of the wheel.

In carrying my invention into practice, I provide a wheel comprising a hub 1 having spaced annular flanges 2 and spaced angle metal rims 3 and spokes 4 connecting the inwardly extending vertical webs of the angle metal rim rings with the respective flanges 2 at the same sides of the wheel. This construction provides a wheel body which is light in weight, simple and economical of manufacture, and yet strong and durable. The rings or annular rim sections 3 are connected at intervals by cross cleats or blocks 5, which are terminally bolted or riveted to the outstanding horizontal webs thereof, by which the rims are united and reinforced in a firm and substantial manner, and a gripping tread surface at the same time provided which is adapted for use under ordinary conditions, as for work in the field when the wheel is applied to an agricultural implement or any like vehicle.

For the purpose of securing additional traction or purchase between the wheel and ground, I provide an auxiliary or outside tire, tread or gripping surface, comprising a split metal ring or band 6 adapted to surround and rest against the series of cleats 5, and provided at intervals with angularly disposed gripping members or spurs 7, preferably of a character to firmly engage the ground and prevent the wheel from slipping. The ends of this ring or band 7 are connected by bolts or rivets 8 with one of the cleats 5 of the wheel, said rivets or bolts passing through perforations in the ends of the band and the particular cleat in question. The ring or band is also secured at intervals to other cleats 5 around the periphery of the wheel by bolts or rivets 9, which also pass through perforations in the band and cleats. It will, of course, be understood that the outer tire 6 may be made a permanent fixture of the wheel, particularly when the wheel is constantly used upon roads, rough ground and slippery surfaces, in which event the said outer tire may be riveted in place, but when it is desired to detachably secure the said outer tire in place the bolts are preferably employed. By detaching these bolts the outer tire may be removed to permit the cleats 5 to be employed as gripping surfaces, in which event the outer tire may be carried upon some convenient portion of the vehicle for use when occasion requires. When it is desired to use the outer tire, it may then be slipped in position upon the wheel and fastened by means of the bolts, thus adapting the wheel to firmly engage the surface of the road or street so as to prevent the wheel from slipping and enable a better purchase to be obtained.

I claim:—

A wheel comprising a hub, spaced annular flanges surrounding the hub, a pair of spaced angle metal rim members, having outwardly extending webs, disposed at right angles to said flanges and inwardly extending webs parallel with each other and lying in planes parallel with and inside the planes of the flanges, angularly disposed series of spokes connecting the respective flanges with the respective inwardly extending webs of the rim members on opposite sides of the vertical center of the wheel, transverse cleat blocks resting against the outwardly projecting flanges of the rim members and extending the full width of the wheel, fastenings connecting said cleat blocks with the respective outwardly extending flanges of the rim members, an annular rim resting against and surrounding said series of cleat blocks and coextensive in width with the length thereof, and fastening members connecting said rim with the cleat blocks on a line between the rim members.

In testimony whereof I affix my signature in presence of two witnesses.

VALENTINE BIELA.

Witnesses:
 JOHN KYRISH,
 BRON KYRISH.

Copies of this patent may be obtained for five cents each, by addressing the "Commissioner of Patents, Washington, D. C."